US012625529B2

(12) United States Patent
Schnell et al.

(10) Patent No.: US 12,625,529 B2
(45) Date of Patent: May 12, 2026

(54) SCREW DOWN HOLDER FOR COMPRESSION ATTACHED MEMORY MODULES

(71) Applicant: DELL PRODUCTS L.P., Round Rock, TX (US)

(72) Inventors: Arnold Thomas Schnell, Hutto, TX (US); Jing-Tang Wu, Xizhi District (TW); Spike Tzeng, KeeLung (TW)

(73) Assignee: Dell Products L.P., Round Rock, TX (US)

( * ) Notice: Subject to any disclaimer, the term of this patent is extended or adjusted under 35 U.S.C. 154(b) by 349 days.

(21) Appl. No.: 18/313,816

(22) Filed: May 8, 2023

(65) Prior Publication Data

US 2024/0377864 A1     Nov. 14, 2024

(51) Int. Cl.
G06F 1/18          (2006.01)
G06F 1/183         (2026.01)
H01R 12/71         (2011.01)

(52) U.S. Cl.
CPC ............ G06F 1/183 (2013.01); H01R 12/712 (2013.01)

(58) Field of Classification Search
CPC .................. G06F 1/183; H01R 12/712; A45C 2011/188
See application file for complete search history.

(56) References Cited

U.S. PATENT DOCUMENTS

| | | | |
|---|---|---|---|
| 9,329,643 B2 * | 5/2016 | Tobias ..................... | G06F 1/20 |
| 11,205,104 B2 | 12/2021 | Fellman | |
| 2010/0038269 A1 | 2/2010 | Picard | |

* cited by examiner

*Primary Examiner* — Vanessa Girardi
(74) *Attorney, Agent, or Firm* — Larson Newman, LLP

(57) ABSTRACT

A holder for a compression attached memory module (CAMM) includes a spine and first and second beam protrusions. The spine encloses an end of the CAMM adjacent to a contact pad array of a CAMM printed circuit board (PCB) of the CAMM. The first beam protrusion extends from the spine away from the end of the CAMM. The second beam protrusion extends from the spine away from the end of the CAMM. When the CAMM is installed into the holder and installed into an information handling system, the first and second beam protrusions transfer a compression applied at the first and a compression applied at the second beam protrusions to a portion of the spine between the first beam protrusion and the second beam protrusion to limit a deformation of the CAMM PCB.

20 Claims, 3 Drawing Sheets

200

Top

100

Side

100

View A-A

100

SCREW DOWN HOLDER FOR COMPRESSION ATTACHED MEMORY MODULES

Related subject matter is contained in co-pending U.S. patent application Ser. No. 18/428,132 entitled "CARRIER MODULE FOR STACKED COMPRESSION ATTACHED MEMORY MODULES," by Arnold Thomas Schnell et al., filed Jan. 31, 2024, the disclosure of which is hereby incorporated by reference.

Related subject matter is contained in co-pending U.S. patent application Ser. No. 18/428,737 entitled "CARRIER MODULE FOR GROUNDING STACKED COMPRESSION ATTACHED MEMORY MODULES," by Arnold Thomas Schnell et al., filed Jan. 31, 2024, the disclosure of which is hereby incorporated by reference.

Related subject matter is contained in co-pending U.S. patent application Ser. No. 18/428,952 entitled "CARRIER MODULE TO PROVIDE A THERMAL SOLUTION FOR STACKED COMPRESSION ATTACHED MEMORY MODULES," by Arnold Thomas Schnell et al., filed Jan. 31, 2024, the disclosure of which is hereby incorporated by reference.

FIELD OF THE DISCLOSURE

This disclosure generally relates to information handling systems, and more particularly relates to an I-beam holder for compression attached memory modules (CAMMs).

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

A holder for a compression attached memory module (CAMM) may include a spine and first and second beam protrusions. The spine may enclose an end of the CAMM adjacent to a contact pad array of a CAMM printed circuit board (PCB) of the CAMM. The first beam protrusion may extend from the spine away from the end of the CAMM. The second beam protrusion may extend from the spine away from the end of the CAMM. When the CAMM is installed into the holder and installed into an information handling system, the first and second beam protrusions may transfer a compression applied at the first and a compression applied at the second beam protrusions to a portion of the spine between the first beam protrusion and the second beam protrusion to limit a deformation of the CAMM PCB.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items. As used herein, the terms "compression dual in-line memory module" and "CAMM" may be understood to be equivalent to, and superseded by the terms "Compression Attached Memory Module" and "CAMM," respectively, as may be understood by persons skilled in the art.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1A:
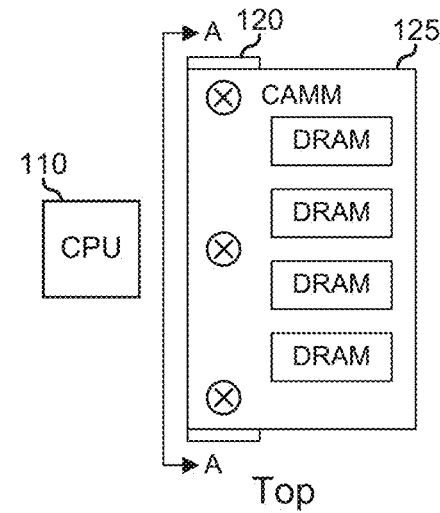
FIG. 1A is a block diagram of a top view of an information handling system as is known in the prior art.
Figure 1B:
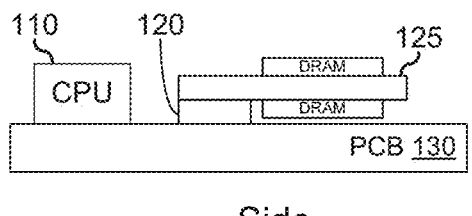
FIG. 1B is a block diagram of a side view of the information handling system of FIG. 1A.
Figure 1C:
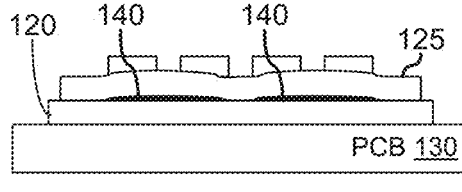
FIG. 1C is a block diagram of a sectional side view of the information handling system of FIG. 1A.

FIGS. 1A-1C illustrates an information handling system 100 in accordance with the prior art, where FIG. 1A is a top view of information handling system 100, FIG. 1B, is a side view of the information handling system, and FIG. 1C is a sectional side view of the information handling system. Information handling system 100 includes a processor 110, and a compression connector 120 assembled onto a printed circuit board (PCB) 130. Compression connector 120 is populated with a compression attached memory module (CAMM) that includes memory devices populated on a CAMM PCB 125.

Compression connector 120 represents a z-axis, or "vertical," compression connector that provides a stand-off from PCB 130. Compression connector 120 includes separate metal contact elements on a top surface of the compression connector, one for each signal line and power line. CAMM PCB 125 includes surface contact connections that are compressed to engage with the contact elements of compression connector 120. Examples of compression connectors may include cStack or mezzanine-type connectors from Amphenol, PCBeam connectors from Neoconix, or the like. In a particular embodiment, the memory devices on CAMM PCB 125 are accessed by CPU 110 via both a first memory channel and a second memory channel through compression connector 120. In another embodiment, the memory devices on CAMM PCB 125 are accessed by CPU 110 via only one of the first memory channel or a second memory channel. However in this embodiment, the use of only one memory channel may be based upon a design choice to provide a low-cost design. Compression connector 120 may still include contact elements associated with both memory channels, and the memory devices on CAMM PCB 125 may be configured to utilize only one of the memory channels.

The top view illustrates that CAMM PCB 125 is affixed to compression connector 120 by three (3) screws. Such a mechanism for attaching CAMM PCB 125 to compression connector 120 may include other elements, as needed or desired. For example, compression connector 120 and PCB 130 may include through-holes through which the screws pass, and bolts may be affixed to the screws on the bottom side of the PCB, as needed or desired. The attachment mechanism may include a bolster on the bottom side of PCB 130, as needed or desired. Edge view A-A illustrates a particular case where CAMM PCB 125 exhibits a deformation under the compression applied by the screws. In this case, the deformation results in voids 140 where the contact between compression connector 120 and CAMM PCB 125 may become degraded, resulting in poor signal quality between CPU 110 and the memory devices on the CAMM PCB, and the resulting data errors can cause a system crash of information handling system 100.

Figures 2, 3, 4:
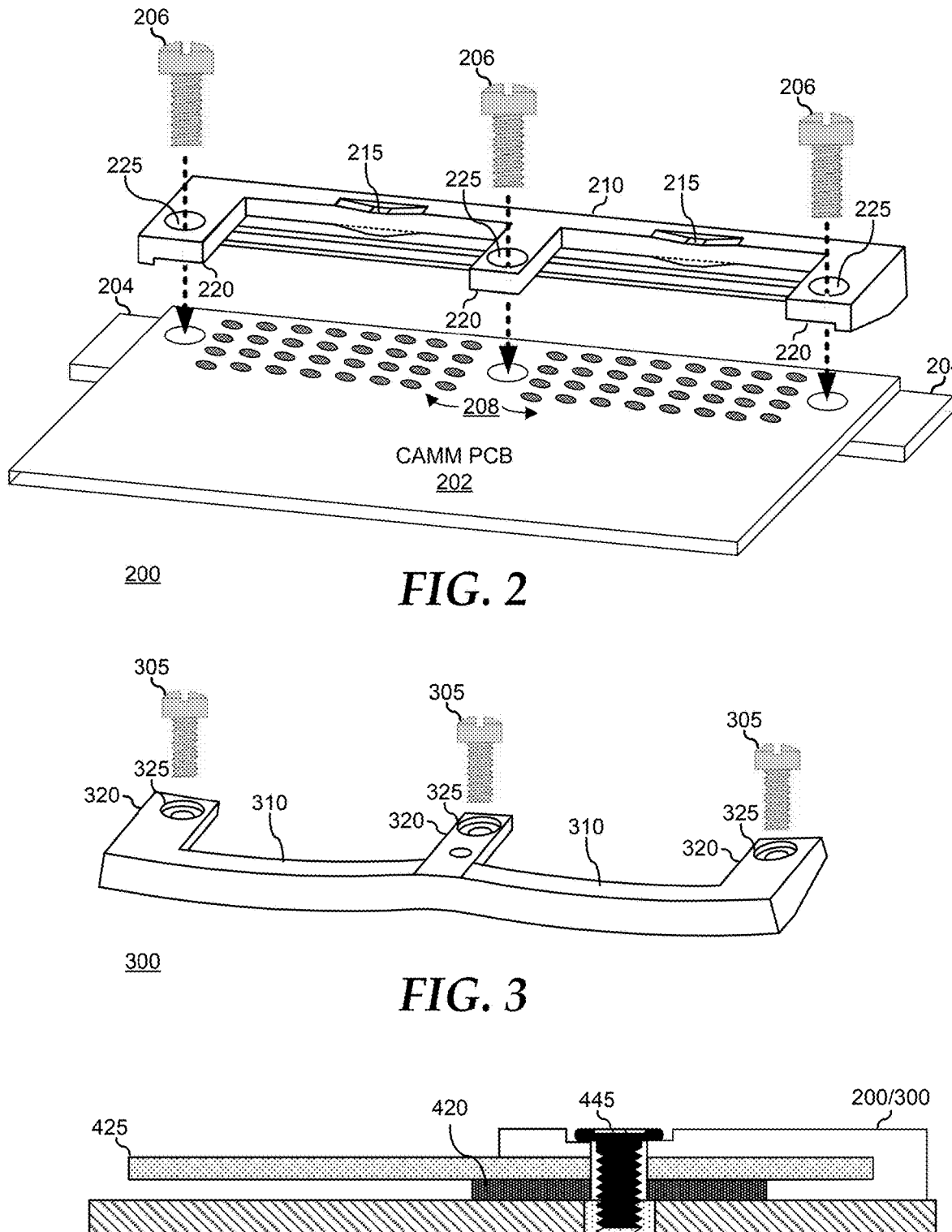
FIG. 2 is a diagram illustrating a holder for compression attached memory modules (CAMMs) according to an embodiment of the current disclosure.
FIG. 3 is a diagram illustrating a holder for CAMMs according to another embodiment of the current disclosure.
FIG. 4 is a block diagram illustrating a side view of an information handling system according to an embodiment of the current disclosure.

FIG. 2 illustrates a CAMM holder 200 configured to counter the deformation of CAMM PCB 202, similar to CAM PCB 125, as described above. CAMM holder 200 is shown in an oblique top view. CAMM holder 200 is formed as an I-beam structure with a spine 210 that encloses a back edge of the captured CAMM PCB 202 adjacent to a contact pad array 208 on a bottom side of the CAMM PCB, and three beam protrusions 220 extending onto the top of the captured CAMM PCB. Each beam protrusion 220 includes a screw hole 225 that is aligned with an associated screw hole in the captured CAMM PCB 202. When the CAMM PCB 202 is installed into CAMM holder 200 and the resulting CAMM assembly is installed into an information handling system such as information handling system 400, as described below, beam protrusions 220 transfer the compression applied at screw holes 225 to spine 210. Because spine 210 encloses the back edge of the captured CAMM PCB 202, the ability of the CAMM PCB to deform under the compression is limited. In a particular embodiment, spine 210 includes detent structures 215 that provide a prestressed downward deformation of the captured CAMM PCB 202 toward the associated compression connector 204 similar to compression connector 120, as described above, such that, when the screws 206 are tightened, the tendency of the CAMM PCB is to remain flat and firmly coupled electrically and mechanically with the compression connector.

FIG. 3 illustrates a CAMM holder 300 similar to CAMM holder 200. As such, CAMM holder 300 is configured to counter the deformation of CAMM PCBs as described above. CAMM holder 300 is shown in an oblique top view from a rearward side. CAMM holder 300 is formed as an I-beam structure with an m-shaped spine 310 that encloses a back edge of the captured CAMM PCB, and three beam protrusions 320 extending onto the top of the captured CAMM PCB. Each beam protrusion 320 includes a screw hole 325 that is aligned with an associated screw hole in the captured CAMM PCB. When the CAMM PCB is installed into CAMM holder 300 and the resulting CAMM assembly is installed into an information handling system such as information handling system 400, as described below, beam protrusions 320 transfer the compression applied at screw holes 325 to spine 310.

Because spine 310 encloses the back edge of the captured CAMM PCB, the ability of the CAMM PCB to deform under the compression is limited. Further, because spine 310 has an inverted m-shape, with lobes protruding downward toward the associated compression connector, CAMM holder 300 is configured to provide a prestressed downward deformation of the captured CAMM PCB toward the associated compression connector. Thus, when the screws 305 are tightened, the tendency of the CAMM PCB is to remain flat and firmly coupled electrically and mechanically with the compression connector is ensured. While described as having an m-shape, a spine similar to spine 310 may have other shapes configured to provide a prestressed downward deformation of the captured CAMM PCB, such as an arch-shape, a v-shape, or the like.

FIG. 4 illustrates an information handling system 400 including a compression connector 420, illustrated by dark stippling, similar to compression connector 120 assembled onto a PCB 430, illustrated by cross-hatching. Compression connector 420 is populated with a CAMM 425, illustrated by medium stippling assembled into a CAMM holder, illustrated with no fill pattern. Here, the CAMM holder may be representative of either one of CAMM holder 200 or CAMM holder 300, as needed or desired. The CAMM/holder assembly is affixed to PCB 430 by a backside bolster 440, illustrated by light stippling, and three screws 445, illustrated in black (one screw illustrated).

CAMM holders 200 and 300 may be fabricated using any suitable material, and will typically be fabricated of an insulating material, but this is not necessarily so. For example, CAMM holders 200 and 300 may be fabricated in an injection molding process utilizing a suitable plastic material. CAMM holders 200 and 300 may be provided with a material that has a rigidity sufficient to ensure the function of reducing the deformation within a CAMM PCB as needed or desired. The extent of detent structures 215 on beam 210, or of the depth of the m-shape of beam 310 may be designed to provide a desired amount of prestress on the CAMM PCB, as needed or desired.

Figure 5:
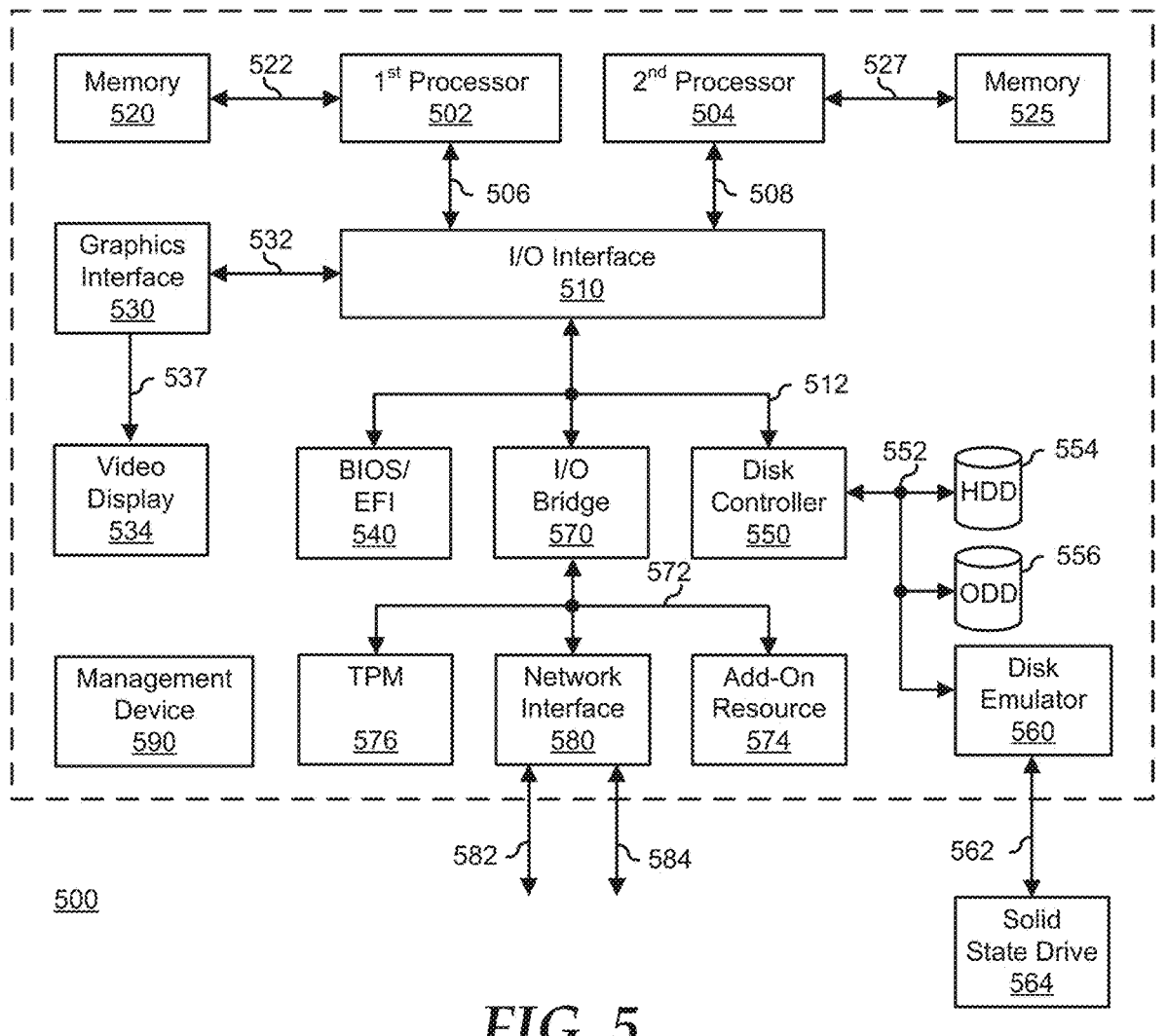
FIG. 5 is a block diagram illustrating a generalized information handling system according to another embodiment of the present disclosure.

FIG. 5 illustrates a generalized embodiment of an information handling system 500 similar to information handling system 100. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 500 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 500 can include processing resources for executing machine-executable code, such as a central processing unit (CPU), a programmable logic array (PLA), an embedded device such as a System-on-a-Chip (SoC), or other control logic hardware. Information handling system 500 can also include one or more computer-readable medium for storing machine-executable code, such as software or data. Additional components of information handling system 500 can include one or more storage devices that can store machine-executable code, one or more communications ports for communicating with external devices, and various input and output (I/O) devices, such as a keyboard, a mouse, and a video display. Information handling system 500 can also include one or more buses operable to transmit information between the various hardware components.

Information handling system 500 can include devices or modules that embody one or more of the devices or modules described below, and operates to perform one or more of the methods described below. Information handling system 500 includes a processors 502 and 504, an input/output (I/O) interface 510, memories 520 and 525, a graphics interface 530, a basic input and output system/universal extensible firmware interface (BIOS/UEFI) module 540, a disk controller 550, a hard disk drive (HDD) 554, an optical disk drive (ODD) 556, a disk emulator 560 connected to an external solid state drive (SSD) 562, an I/O bridge 570, one or more add-on resources 574, a trusted platform module (TPM) 576, a network interface 580, a management device 590, and a power supply 595. Processors 502 and 504, I/O interface 510, memory 520, graphics interface 530, BIOS/UEFI module 540, disk controller 550, HDD 554, ODD 556, disk emulator 560, SSD 562, I/O bridge 570, add-on resources 574, TPM 576, and network interface 580 operate together to provide a host environment of information handling system 500 that operates to provide the data processing functionality of the information handling system. The host environment operates to execute machine-executable code, including platform BIOS/UEFI code, device firmware, operating system code, applications, programs, and the like, to perform the data processing tasks associated with information handling system 500.

In the host environment, processor 502 is connected to I/O interface 510 via processor interface 506, and processor 504 is connected to the I/O interface via processor interface 508. Memory 520 is connected to processor 502 via a memory interface 522. Memory 525 is connected to processor 504 via a memory interface 527. Graphics interface 530 is connected to I/O interface 510 via a graphics interface 532, and provides a video display output 536 to a video display 534. In a particular embodiment, information handling system 500 includes separate memories that are dedicated to each of processors 502 and 504 via separate memory interfaces. An example of memories 520 and 530 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 540, disk controller 550, and I/O bridge 570 are connected to I/O interface 510 via an I/O channel 512. An example of I/O channel 512 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 510 can also include one or more other I/O interfaces, including an Industry Standard Architecture (ISA) interface, a Small Computer Serial Interface (SCSI)

interface, an Inter-Integrated Circuit ($I^2C$) interface, a System Packet Interface (SPI), a Universal Serial Bus (USB), another interface, or a combination thereof. BIOS/UEFI module 540 includes BIOS/UEFI code operable to detect resources within information handling system 500, to provide drivers for the resources, initialize the resources, and access the resources. BIOS/UEFI module 540 includes code that operates to detect resources within information handling system 500, to provide drivers for the resources, to initialize the resources, and to access the resources.

Disk controller 550 includes a disk interface 552 that connects the disk controller to HDD 554, to ODD 556, and to disk emulator 560. An example of disk interface 552 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 560 permits SSD 564 to be connected to information handling system 500 via an external interface 562. An example of external interface 562 includes a USB interface, an IEEE 1394 (Firewire) interface, a proprietary interface, or a combination thereof. Alternatively, solid-state drive 564 can be disposed within information handling system 500.

I/O bridge 570 includes a peripheral interface 572 that connects the I/O bridge to add-on resource 574, to TPM 576, and to network interface 580. Peripheral interface 572 can be the same type of interface as I/O channel 512, or can be a different type of interface. As such, I/O bridge 570 extends the capacity of I/O channel 512 when peripheral interface 572 and the I/O channel are of the same type, and the I/O bridge translates information from a format suitable to the I/O channel to a format suitable to the peripheral channel 572 when they are of a different type. Add-on resource 574 can include a data storage system, an additional graphics interface, a network interface card (NIC), a sound/video processing card, another add-on resource, or a combination thereof. Add-on resource 574 can be on a main circuit board, on separate circuit board or add-in card disposed within information handling system 500, a device that is external to the information handling system, or a combination thereof.

Network interface 580 represents a NIC disposed within information handling system 500, on a main circuit board of the information handling system, integrated onto another component such as I/O interface 510, in another suitable location, or a combination thereof. Network interface device 580 includes network channels 582 and 584 that provide interfaces to devices that are external to information handling system 500. In a particular embodiment, network channels 582 and 584 are of a different type than peripheral channel 572 and network interface 580 translates information from a format suitable to the peripheral channel to a format suitable to external devices. An example of network channels 582 and 584 includes InfiniBand channels, Fibre Channel channels, Gigabit Ethernet channels, proprietary channel architectures, or a combination thereof. Network channels 582 and 584 can be connected to external network resources (not illustrated). The network resource can include another information handling system, a data storage system, another network, a grid management system, another suitable resource, or a combination thereof.

Management device 590 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 500. In particular, management device 590 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 500, such as system cooling fans and power supplies. Management device 590 can include a network connection to an external management system, and the management device can communicate with the management system to report status information for information handling system 500, to receive BIOS/UEFI or system firmware updates, or to perform other task for managing and controlling the operation of information handling system 500. Management device 590 can operate off of a separate power plane from the components of the host environment so that the management device receives power to manage information handling system 500 when the information handling system is otherwise shut down. An example of management device 590 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 590 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A holder for a compression attached memory module (CAMM) printed circuit board (PCB), the holder comprising:

a spine to enclose an end of the CAMM PCB adjacent to a contact pad array of the CAMM PCB;

a first beam protrusion extending from the spine away from the end of the CAMM PCB;

a second beam protrusion extending from the spine away from the end of the CAMM PCB, wherein when the CAMM PCB is installed into the holder and installed into an information handling system, the first and second beam protrusions transfer a compression applied at the first and a compression applied at the second beam protrusions to a portion of the spine between the first beam protrusion and the second beam protrusion to limit a deformation of the CAMM PCB; and a third beam protrusion extending from the spine away from the end of the CAMM PCB.

2. The holder of claim 1, wherein the first beam protrusion includes a first screw hole associated with a first screw hole of the CAMM PCB, and the second beam protrusion includes a second screw hole associated with a second screw hole of the CAMM PCB.

3. The holder of claim 2, wherein, when the CAMM PCB is installed into the holder and installed into an information handling system, the compression applied at the first beam protrusion and the compression applied at the second beam protrusion are applied via respective first and second screw holes.

4. The holder of claim 1, wherein the spine includes a detent structure to provide a prestress to the CAMM PCB.

5. The holder of claim 4, wherein the prestress further limits the deformation of the CAMM PCB.

6. The holder of claim 1, wherein the spine has an arch shape to provide a prestress to the CAMM PCB.

7. The holder of claim 6, wherein the prestress further limits the deformation of the CAMM PCB.

8. The holder of claim 1, wherein, when the CAMM PCB is installed into the holder and installed into an information handling system, the second and third beam protrusions transfer the compression applied at the second beam protrusion and a compression applied at the third beam protrusions to a portion of the spine between the second beam protrusion and the third beam protrusion to limit the deformation of the CAMM PCB.

9. The holder of claim 8, wherein the third beam protrusion includes a third screw hole associated with a third screw hole of the CAMM PCB.

10. The holder of claim 9, wherein, when the CAMM PCB is installed into the holder and installed into an information handling system, the compression applied at the third beam protrusion is applied via the third screw hole.

11. A method for providing a holder for a compression attached memory module (CAMM) printed circuit board (PCB), the method comprising:

providing, on the holder, a spine to enclose an end of the CAMM PCB adjacent to a contact pad array of the CAMM PCB;

providing, on the holder, a first beam protrusion extending from the spine away from the end of the CAMM PCB;

providing, on the holder, a second beam protrusion extending from the spine away from the end of the CAMM PCB wherein, when the CAMM PCB is installed into the holder and installed into an information handling system, the first and second beam protrusions transfer a compression applied at the first and a compression applied at the second beam protrusions to a portion of the spine between the first beam protrusion and the second beam protrusion to limit a deformation of the CAMM PCB; and providing, on the holder, a third beam protrusion extending from the spine away from the end of the CAMM.

12. The holder of claim 11, further comprising providing, on the spine, an arch shape to provide a prestress to further limit the deformation of the CAMM PCB.

13. The method of claim 11, further comprising:

providing, on the first beam protrusion, a first screw hole associated with a first screw hole of the CAMM PCB; and providing, on the second beam protrusion, a second screw hole associated with a second screw hole of the CAMM PCB.

14. The method of claim 13 wherein, when the CAMM PCB is installed into the holder and installed into an information handling system, the compression applied at the first beam protrusion and the compression applied at the second beam protrusion are applied via respective first and second screw holes.

15. The method of claim 1, further comprising providing, on the spine, a detent structure to provide a prestress to the CAMM PCB.

16. The method of claim 15, wherein the prestress further limits the deformation of the CAMM PCB.

17. The method of claim 11, wherein when the CAMM PCB is installed into the holder and installed into an information handling system, the second and third beam protrusions transfer the compression applied at the second beam protrusion and a compression applied at the third beam protrusions to a portion of the spine between the second beam protrusion and the third beam protrusion to limit the deformation of the CAMM PCB.

18. The method of claim 17, further comprising providing, on the third beam protrusion, a third screw hole associated with a third screw hole of the CAMM PCB.

19. The method of claim 18, wherein, when the CAMM PCB is installed into the holder and installed into an information handling system, the compression applied at the third beam protrusion is applied via the third screw hole.

20. An information handling system, comprising:

a main printed circuit board (PCB);

a compression connector;

a compression attached memory module (CAMM) having a CAMM PCB; and a CAMM holder including:

a spine to enclose an end of the CAMM PCB adjacent to a contact pad array of the CAMM PCB;

a first beam protrusion extending from the spine away from the end of the CAMM PCB;

a second beam protrusion extending from the spine away from the end of the CAMM PCB wherein, when the CAMM PCB is installed into the holder and installed into an information handling system, the first and second beam protrusions transfer a compression applied at the first beam protrusion and a compression applied at the second beam protrusion to a portion of the spine between the first beam protrusion and the second beam protrusion to limit a deformation of the CAMM PCB; and a third beam protrusion extending from the spine away from the end of the CAMM.

* * * * *